(12) United States Patent
Sheldon et al.

(10) Patent No.: US 11,867,986 B2
(45) Date of Patent: Jan. 9, 2024

(54) OPTICAL INSERT FOR EYEWEAR

(71) Applicant: Brent Sheldon, Miami, FL (US)

(72) Inventors: Brent Sheldon, Miami, FL (US); Guy Brousseau, Marieville (CA)

(*) Notice: Subject to any disclaimer, the term of this patent is extended or adjusted under 35 U.S.C. 154(b) by 245 days.

(21) Appl. No.: 17/345,087

(22) Filed: Jun. 11, 2021

(65) Prior Publication Data
US 2021/0397026 A1 Dec. 23, 2021

Related U.S. Application Data

(60) Provisional application No. 63/042,297, filed on Jun. 22, 2020.

(51) Int. Cl.
G02C 9/04 (2006.01)
(52) U.S. Cl.
CPC .................................. G02C 9/04 (2013.01)
(58) Field of Classification Search
CPC .............................. G02C 9/04; G02C 2200/08
USPC ..................................................... 351/41, 57
See application file for complete search history.

(56) References Cited

U.S. PATENT DOCUMENTS

| 5,080,475 A | 1/1992 | Ferron |
| 5,936,702 A * | 8/1999 | Cheong ..................... G02C 9/04 351/57 |
| 6,260,964 B1 * | 7/2001 | Kroman ................... G02C 9/04 351/57 |
| 7,244,022 B2 * | 7/2007 | Lee .......................... G02C 1/00 351/57 |
| 2017/0045758 A1 | 2/2017 | Bailey |

OTHER PUBLICATIONS

International Search Report issued in corresponding PCT Application No. PCT/CA2021/050767; search completed Jul. 9, 2021.

* cited by examiner

Primary Examiner — Tuyen Tra

(57) ABSTRACT

There is provided an optical insert for transforming conventional eyewear into eyewear having an additional purpose. The optical insert comprises an extender portion which holds a lens on a first end and a mounting assembly on a second end opposite the first end. The mounting assembly comprises a profile which matches the profile of the conventional eyewear lens retainer. The lens of the conventional eyewear is configured to be removed and replaced with the optical insert. In one embodiment, the lens of the optical insert can comprise dark lenses which can be useful, for example, to transform conventional eyeglasses into prescription sunglasses.

23 Claims, 11 Drawing Sheets

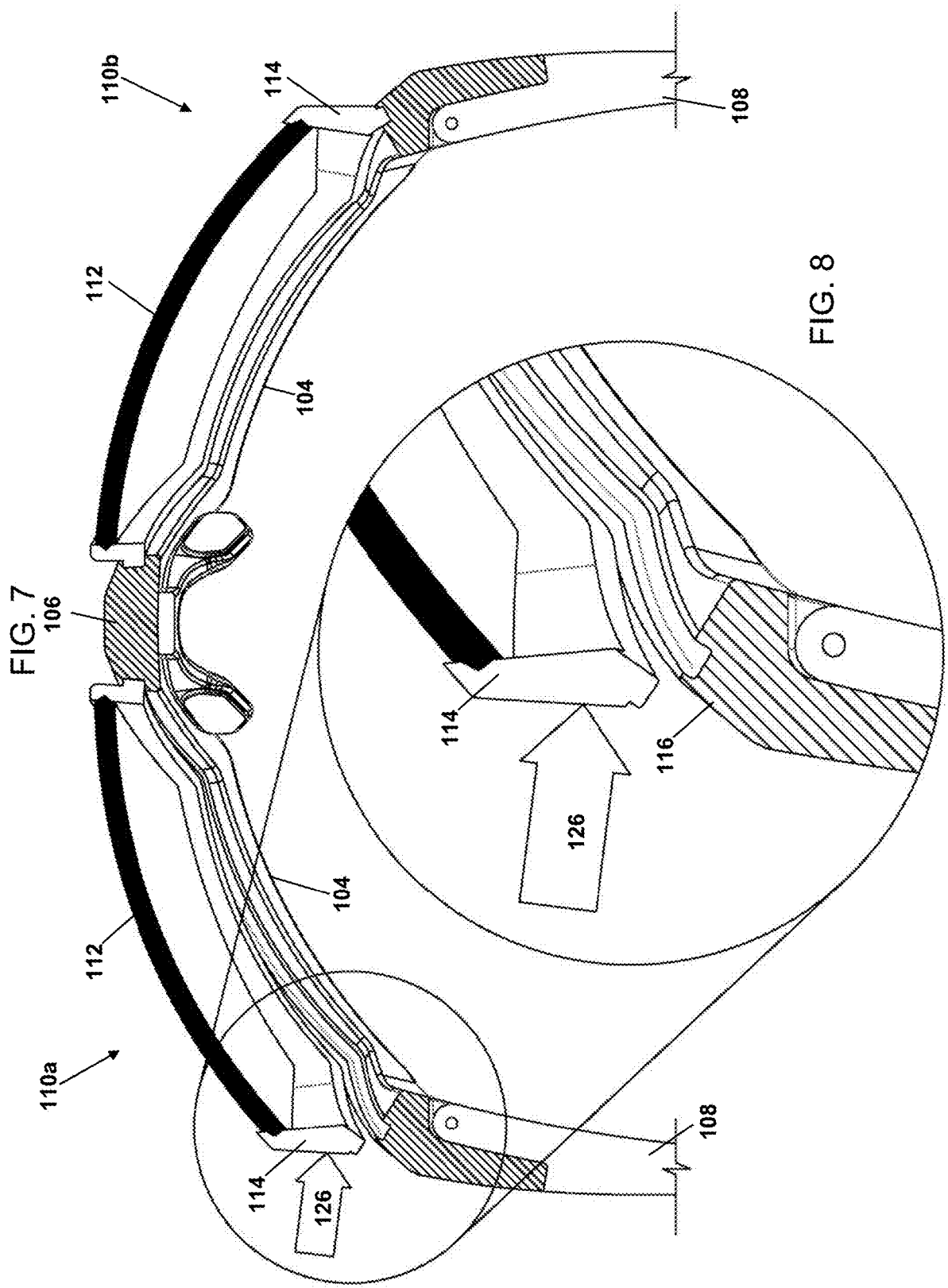

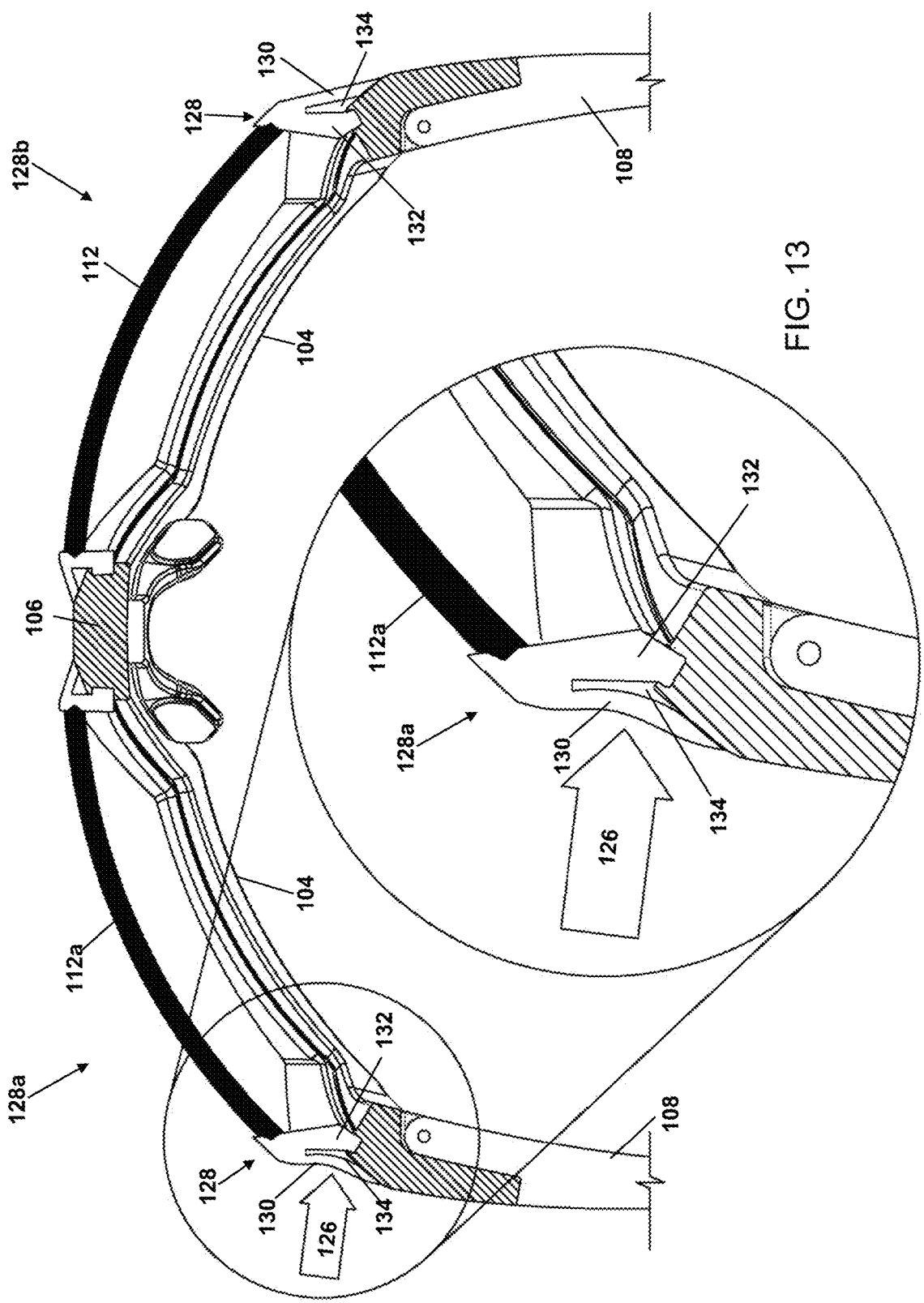

OPTICAL INSERT FOR EYEWEAR

CROSS-REFERENCE TO RELATED APPLICATIONS

This application claims priority to U.S. Provisional Patent Application No. 63/042,297 filed on Jun. 22, 2020, entitled "Optical Insert for Eyewear" and the entire contents of which is incorporated herein by reference.

TECHNICAL FIELD

The following relates to assemblies for eyewear, in particular to lens inserts for eyewear, which may include prescription lenses.

DESCRIPTION OF THE RELATED ART

Conventional eyewear, particularly prescription eyeglasses, may be required by a user at all or most times to improve their vision. Eyeglasses generally include a frame that supports one or more lenses. The frame typically includes a nose bridge or nose pieces that engage the user's nose to support the eyeglasses on the user's head. Eyeglasses also typically include a pair of arms attached to (or integral with) the frame, to further support the eyeglasses, e.g. by resting the arms on the user's ears or engaging their head in the temple region.

It is known that sunglasses are a form of protective eyewear designed primarily to prevent bright sunlight and high-energy visible light from damaging or discomforting a user's eyes. Sunlight may make it difficult for a user to see clearly due to the increased brightness and glare entering the user's eyes. Typical sunglasses include lenses which are darkened to prevent the sunlight from entering the user's eyes. While prescription sunglasses exist, the costs associated with having prescription lenses for sunglasses can be prohibitive. Sunglasses having prescriptions may also require the user to carry a pair of prescription eyeglasses for use when sunglasses are not required, such as in an indoor environment. Prescription sunglasses having transition lenses also exist, however, the costs associated with these can be significant.

To overcome this problem, users may use "over the glasses" or OTG sunglasses. OTG sunglasses fit over the user's prescription eyewear, allowing the user to block out unwanted sunlight as well as see clearly using the prescription eyewear.

One problem with OTG type eyewear is that the OTG frames often rest on the prescription frames, which can cause the prescription frames to pull downwardly on the user's nose, causing misalignment of the lenses and/or causing general discomfort. OTG eyewear can also cause fogging on the prescription lenses prohibiting the user from seeing clearly.

Moreover, typical OTG frames may rest or be pushed against the front of the prescription lenses, which can cause damage to the more valuable eyewear, or cause the prescription lenses to impinge the user's face.

These problems persist with many types of eyewear, including sunglasses, prescription glasses, safety glasses, and the like. There remains a need for eyewear which addresses at least one of the above-noted disadvantages.

SUMMARY

In one aspect, there is provided eyewear comprising: a frame having at least a first lens retainer with a defined lower profile; the frame further comprising a nose bridge portion, and a pair of arms attached thereto; the lens retainer holding an optical insert having a mounting assembly and a lower profile which matches with a profile of the defined profile of the lens retainer.

In another aspect, there is provided a method of transforming conventional lenses of eyewear using an optical insert or a plurality of optical inserts. The method comprises: forming an optical insert having a mounting assembly and a lower profile which matches with a profile of the conventional lenses; removing the conventional lenses from an eyewear frame, and replacing the conventional lenses with the optical inserts.

In yet another aspect, there is provided an optical insert for transforming conventional lenses of eyewear. The optical insert includes an extender portion having a first end for attaching a new lens and a mounting assembly on a second end opposite the first end for attaching to the lens retainer. The mounting assembly comprising a profile which matches that of the defined lower profile of the lens retainer such that the extender portion having the new lens attached at the first end is mounted to the lens retainer using the mounting assembly.

BRIEF DESCRIPTION OF THE DRAWINGS

Embodiments will now be described by way of example only with reference to the appended drawings wherein:

FIG. 7 is a cross-sectional view of the eyewear having optical inserts;

FIG. 8 is an enlarged view of the optical insert shown in FIG. 7 ejecting upon receiving an impact;

FIG. 12 is a cross-sectional view of eyewear having double wall optical inserts; and FIG. 13 is an enlarged view of the double wall optical insert shown in FIG. 12 ejecting upon receiving an impact.

DETAILED DESCRIPTION

An optical insert can be provided to transform eyewear from a first, conventional configuration to a second configuration. The optical insert comprises an extender portion which holds a new lens on a first end and comprises a mounting assembly on a second end opposite the first end. The mounting assembly comprises a profile which matches that of the conventional lens retainer that allows the eyewear to transform, for example, from conventional sunglasses into prescription sunglasses.

Figure 1:
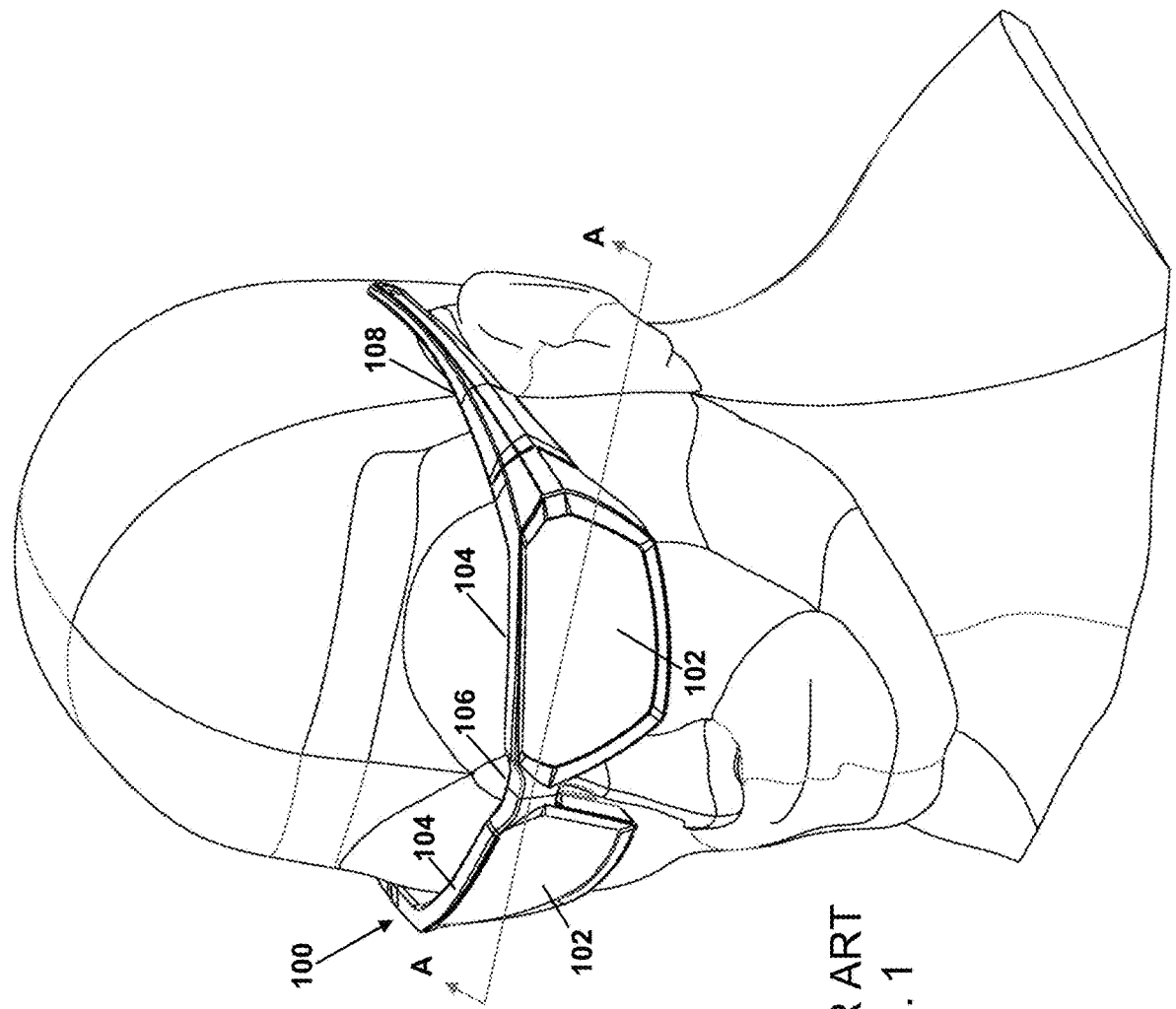
FIG. 1 is a perspective view of a user wearing conventional eyewear.
Figure 2:
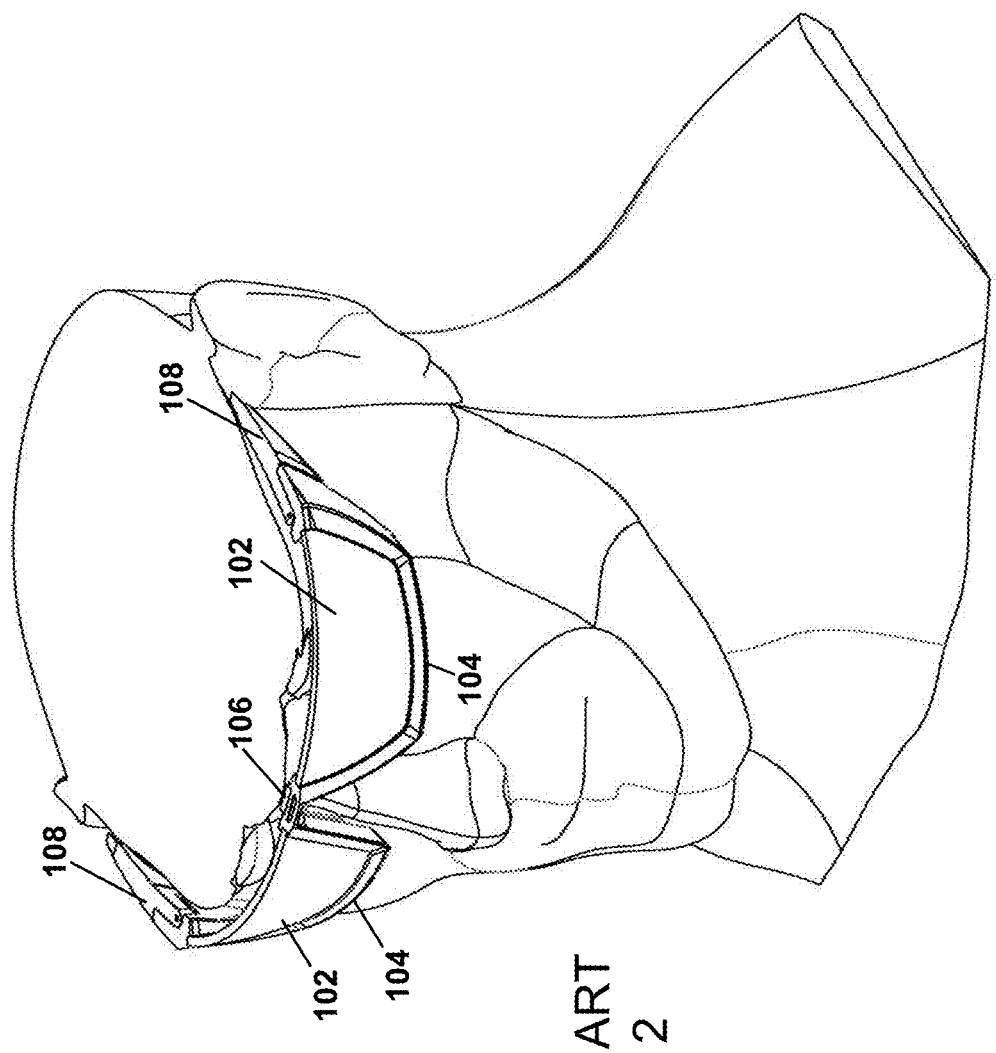
FIG. 2 is a cross-sectional view of FIG. 1, taken along line A-A.

Turning now to the figures, FIG. 1 is a perspective view of a user wearing conventional eyewear. Conventional eyewear generally comprises a frame 100 that supports one or more lenses 102. The frame 100 typically includes a nose bridge 106 or nose pieces that engage the user's nose to support the glasses on the user's head. Eyewear also typically include a pair of arms 108 attached to (or integral with) the frame 100, to further support the eyewear, e.g. by resting the arms on the user's ears or engaging their head in the temple region. FIG. 2 shows a cross-sectional view of the conventional eyewear shown in FIG. 1. The lenses 102 of the eyewear are positioned relative to one another by inserting into a frame 100, the frame 100 having a pair of lens retainers 104.

Figure 3:
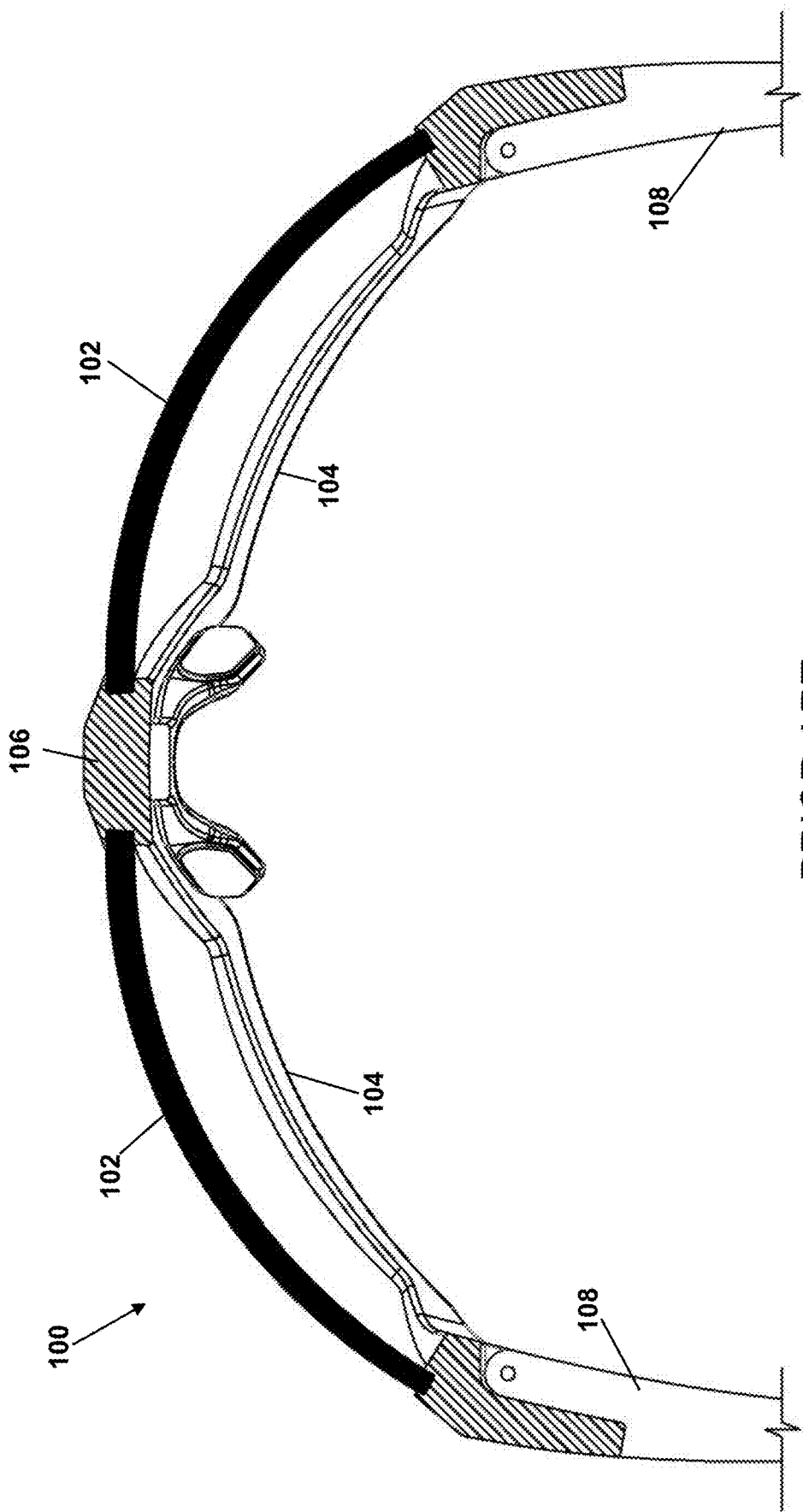
FIG. 3 is a cross-sectional view of the conventional eyewear.

FIG. 3 provides a cross-sectional view of conventional eyewear, taken along line A-A. Generally, eyewear frames 100 comprise the arms 108, lens retainers 104 and the nose bridge portion 106. The frame 100 can be constructed from rigid materials such as plastic, metal, or any other suitable material. The lens retainers 104 comprise empty spaces in which the lens 102 can be inserted. For example, prescription lens can be inserted into the lens retainers 104 for producing eyeglasses; dark lenses can be inserted into the lens retainers 104 for producing sunglasses; and dark lenses having a prescription can be inserted into the lens retainers 104 for producing prescription sunglasses. The lenses 102 chosen for typical eyewear production are most commonly comprise a single layer of transparent glass or plastic.

Figure 4:
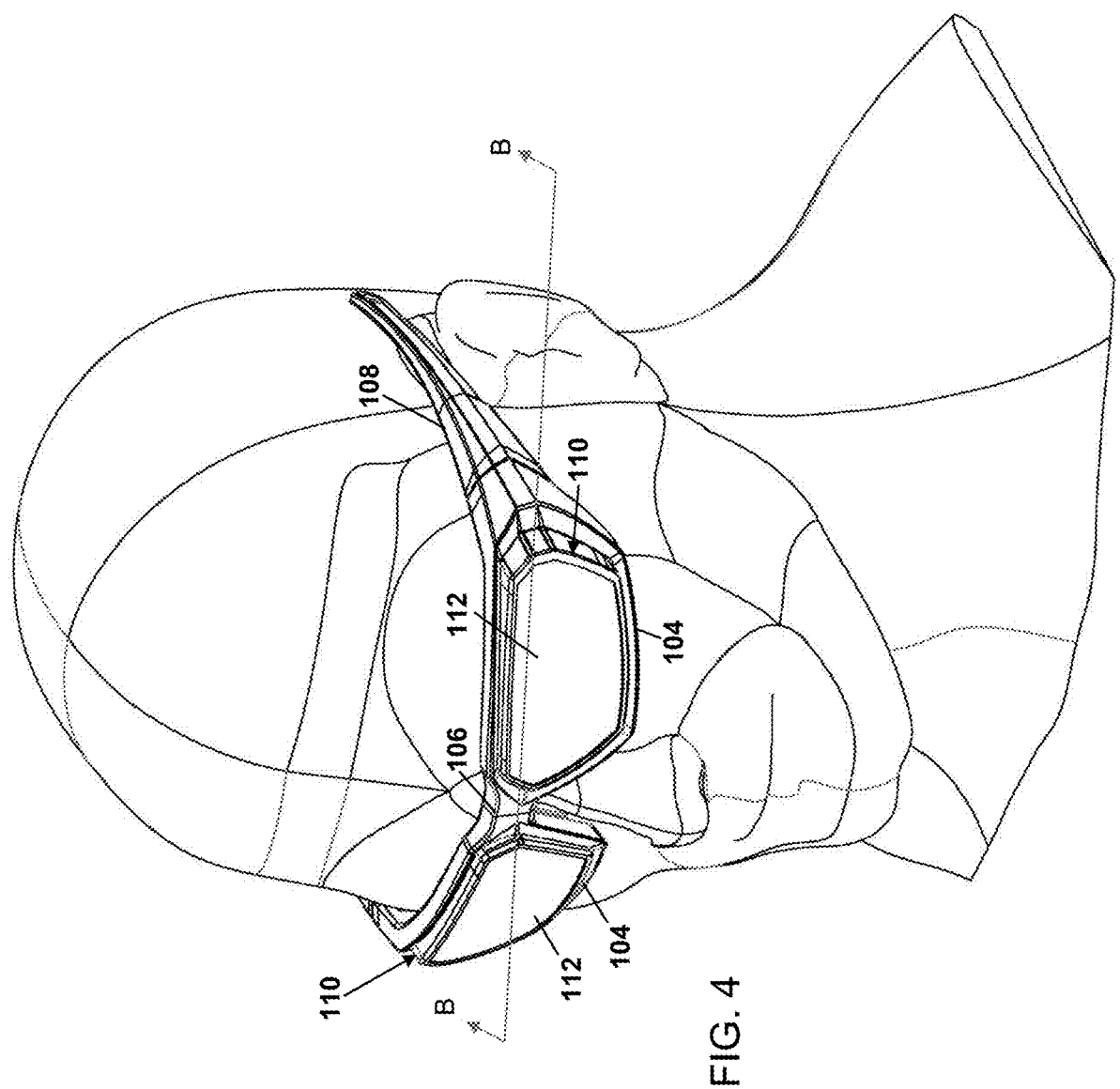
FIG. 4 is a perspective view of a user wearing eyewear having optical inserts.

FIG. 4 is a perspective view of a user wearing eyewear having optical inserts 110. The eyewear comprises a frame 100 having a pair of lens retainers 104, each with a defined lower profile. The frame 100 can also comprise a nose bridge portion 106, and a pair of arms 108. Typically, the lens retainers 104 hold lenses 102 which are removable. The defined lower profiles of the lens retainers 104 allow the optical insert 110 or a plurality of optical inserts 110 to be removably inserted therein. The optical insert 110 comprises a new lens portion 112, a mounting assembly and a lower profile which matches the profile of the lens retainer 104. The optical insert 110 can be inserted into the lens retainer 104 of any pair of conventional eyewear, since the lower profile of the optical insert 110 matches the profile of the lens retainer 104. This can be useful, for example, for transforming conventional sunglasses into prescription sunglasses using an optical insert or a plurality of optical inserts.

A method of transforming conventional lenses of eyewear is provided. An optical insert 110 is formed having a mounting assembly and a lower profile which matches with a profile of a conventional lens. The conventional lenses 102 from an eyewear frame 100 can be removed and replaced with the optical inserts 110. Alternatively, the optical insert 110 can be placed on top of the conventional lens 102, without removing the original lens 102 or provide profiles for mounting multiple lenses in the inserts 110 (not shown). The lens portion 112 of the optical insert 110 can comprise dark lenses which can be useful, for example, to transform conventional eyeglasses into prescription sunglasses.

Figure 5:
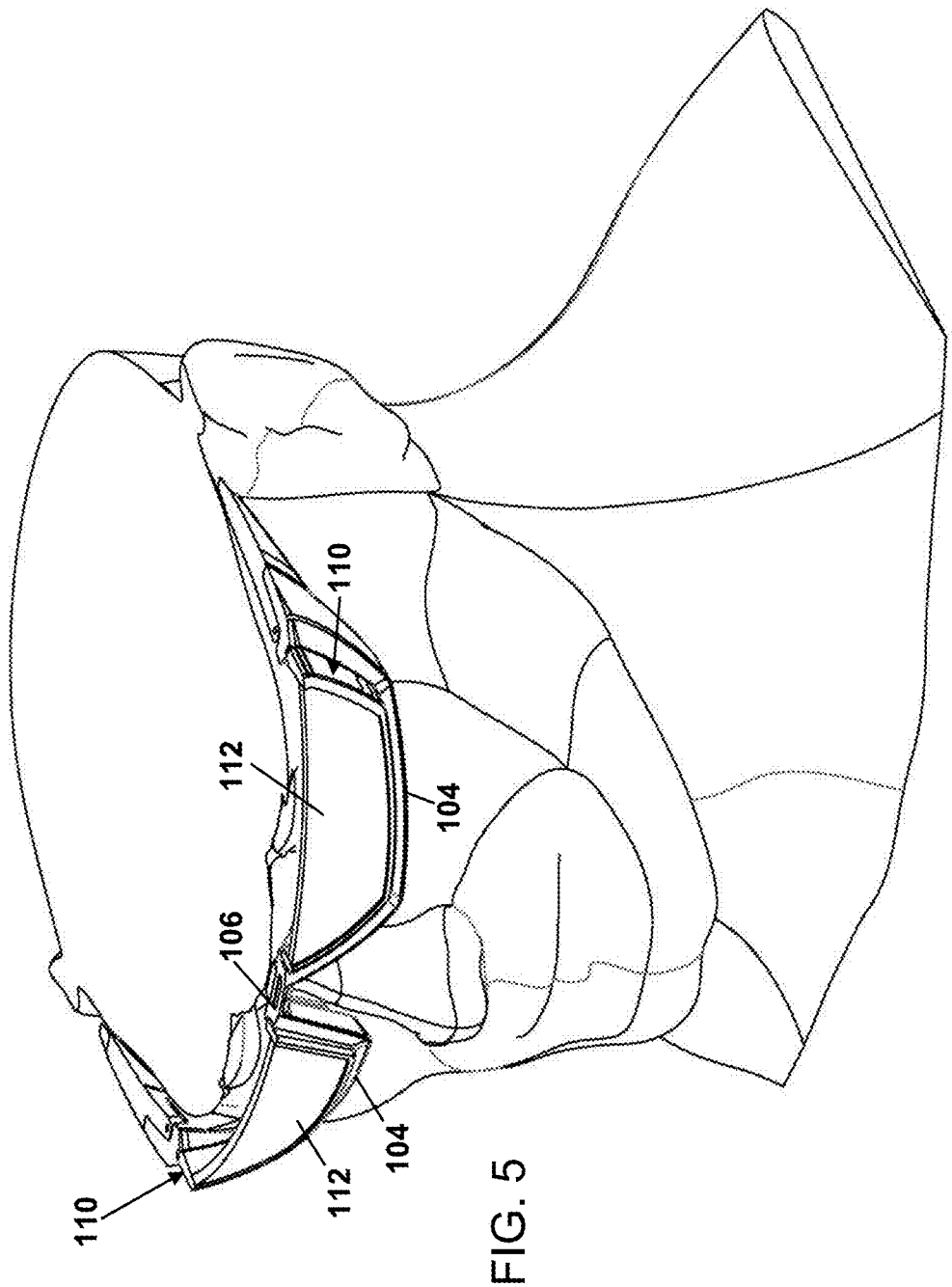
FIG. 5 is a cross-sectional view of FIG. 4, taken along line B-B.

FIG. 5 provides a cross-sectional view of FIG. 4, taken along line B-B. The eyewear having the original lenses 102 can comprise a frame 100 having a pair of lens retainers 104, each with a defined lower profile. The frame 100 can also comprise a nose bridge portion 106, and a pair of arms 108. Typically, the lens retainers 104 hold lenses 102 which are removable. The original, or, conventional lenses 102 are removed the from the eyewear and replaced with the optical insert 110.

Figure 6:
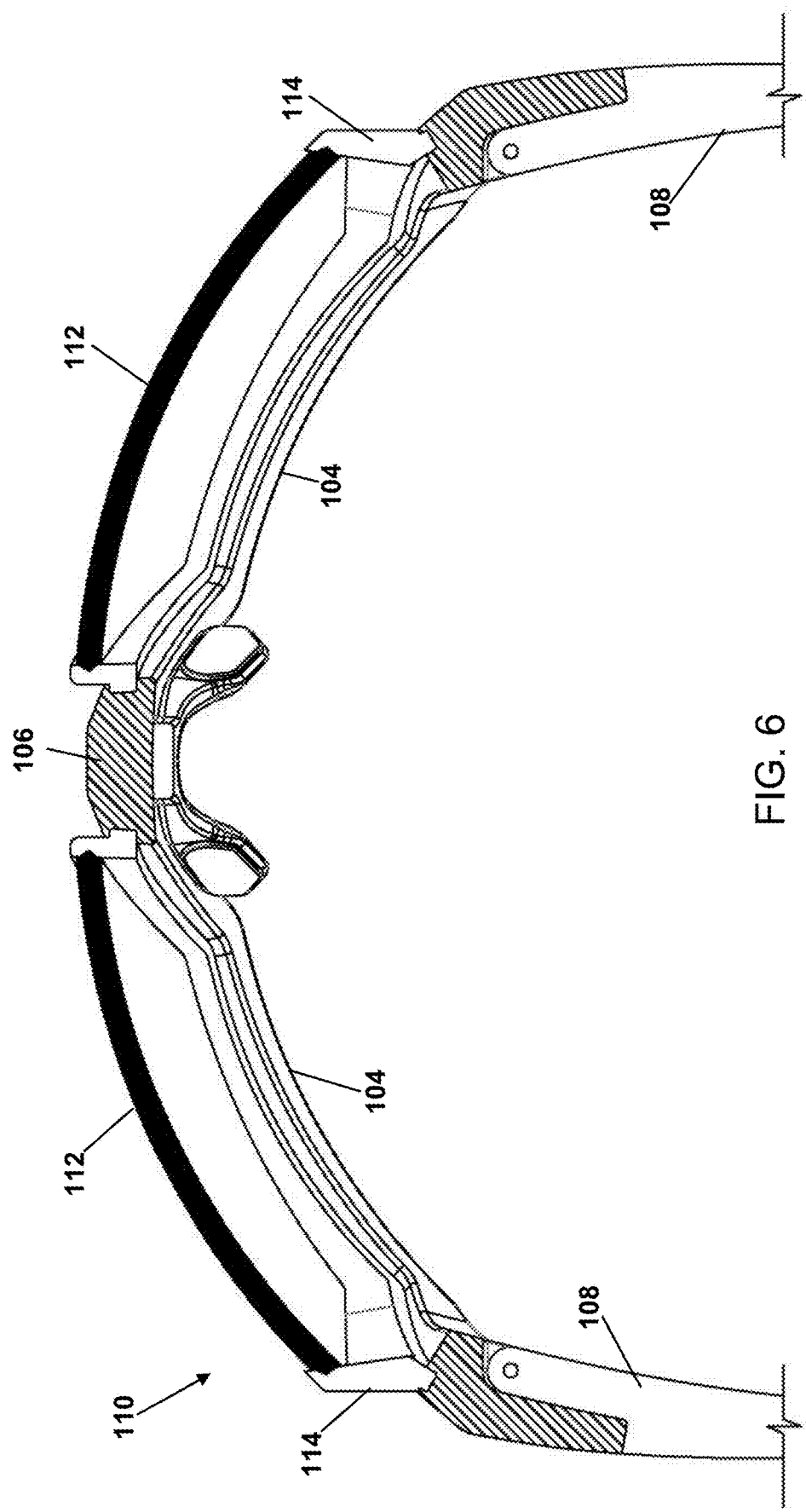
FIG. 6 is a cross-sectional view of the eyewear having optical inserts.

FIG. 6 is a cross-sectional view of the eyewear having optical inserts. The lens retainers of the eyewear shown in FIG. 3 hold removable lenses. The lenses shown in FIG. 3 can be removed and replaced with the optical insert 110. The optical insert 110 comprises an extender portion 114 and a new lens 112 attached to the extender portion 114. When the original, or, conventional lenses 102 are removed the from the eyewear and replaced with the optical insert 110, the extender portion 114 having the new lens 112 attached can replace the conventional lenses 102. The lens 112 of the optical insert 110 can comprise a V-shaped groove. The conventional eyewear may, in one embodiment, comprise a lens 102 having a U-shaped end portion, sized to fit a lens retainer 104 having a U-shaped profile. The conventional lenses 102 are removed, and replaced with an optical insert 110, as shown in FIG. 6. The extender portion 114 comprises a mounting assembly having an end portion which matches with the profile 116 of the lens retainer 104. The extender portion 114 holds a new lens 112 on a first end and comprises a mounting assembly on a second end opposite the first end. The mounting assembly comprises an end portion which matches that of the lens retainer 104. In this embodiment, the new lens 112 comprises a male V-shaped end portion 122 and the first end of the extender portion comprises a complementary female V-shaped groove sized to receive the male end portion. Furthermore, mounting assembly may also comprise a male end portion to match the lens retainer 104 which can comprise a female groove complementary to, and sized to receive, the male end portion of the mounting assembly. It can be appreciated that the male end portions and female grooves can be any suitable shape including V-shaped, U-shaped, O-shaped, etc.

FIG. 7 provides a cross-sectional view of the eyewear having optical inserts 110. FIG. 8 provides an enlarged view of the optical insert 110a shown in FIG. 7. It can be seen that the left optical insert 110a in FIG. 7 is subject to an impact 126, causing the left optical insert 110a to be ejected from the groove 116. On the other hand, the right optical insert 110b stays in place, as it has not been impacted.

Figure 9:
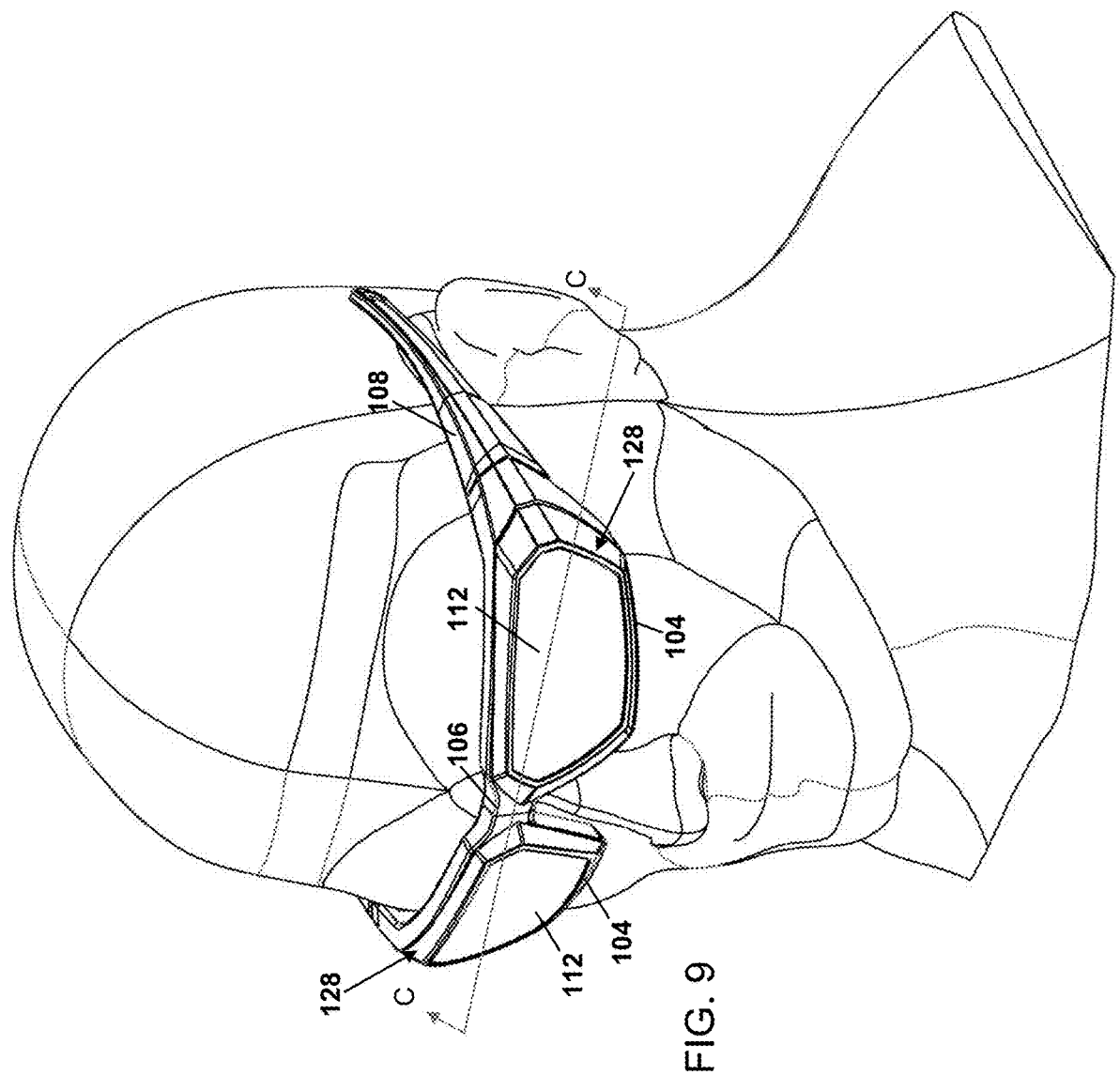
FIG. 9 is a perspective view of a user wearing eyewear having double wall optical inserts.

FIG. 9 provides a perspective view of a user wearing eyewear having double walled optical inserts 128. The eyewear comprises a frame 100 having a pair of lens retainers 104, each with a defined lower profile. The frame 100 can also comprise a nose bridge portion 106, and a pair of arms 108. Typically, the lens retainers 104 hold lenses 102 which are removable. The defined lower profiles of the lens retainers 104 allow an optical insert 128 to be removably inserted therein. The double walled optical insert 128 comprises a double-walled extender portion 130, 132 and a new lens 112 attached to the double walled extender portion 128.

Figure 10:
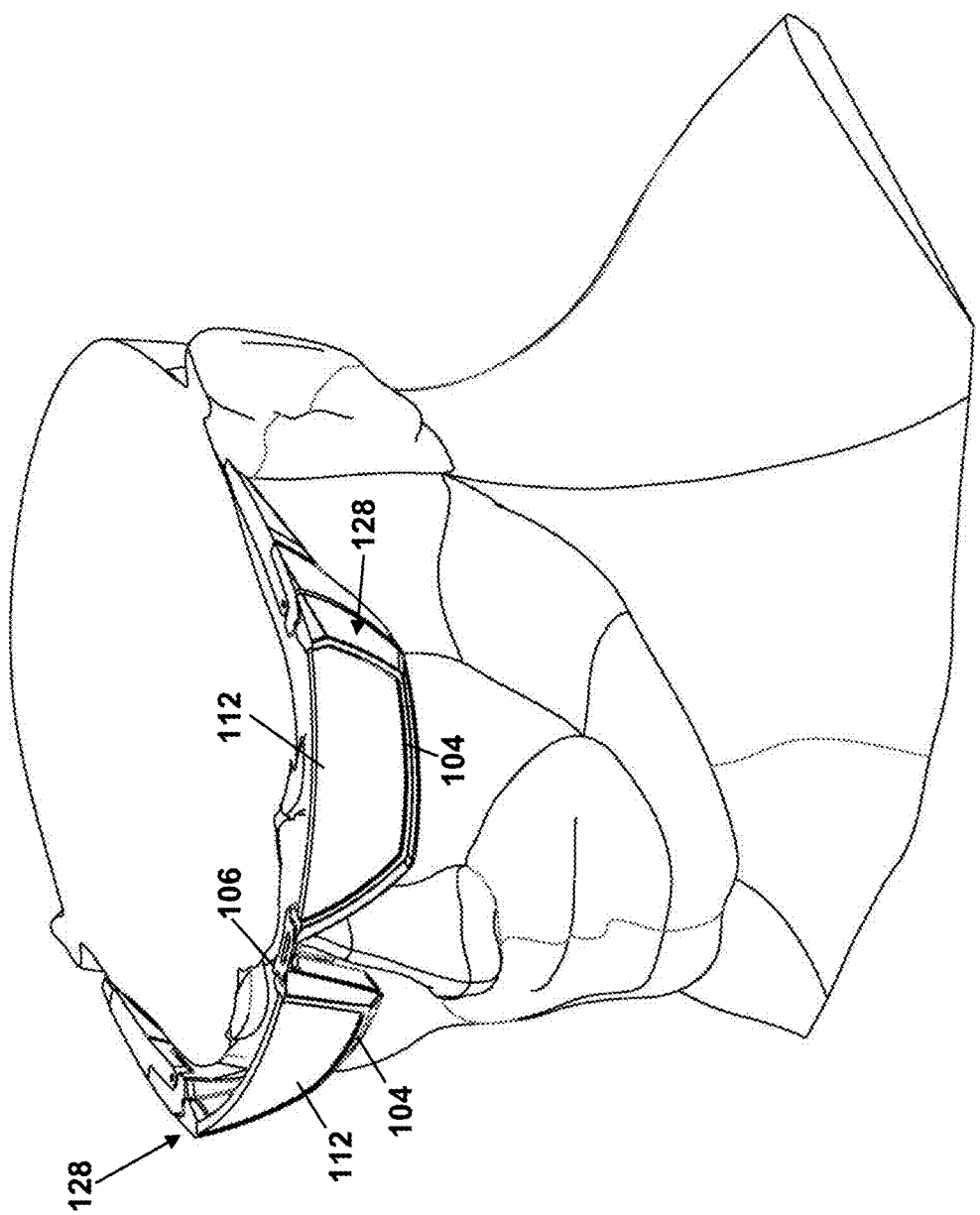
FIG. 10 is a cross-sectional view of FIG. 9, taken along line C-C.

FIG. 10 provides a cross-sectional view of FIG. 9, taken along line C-C. The double walled optical insert 128 can be inserted into the lens retainer 104 as the lower profile of the optical insert matches the profile of the lens retainer 104. The double walled optical insert 128 acts as an extra protective layer to prevent the insert 128 from ejecting upon impact.

The double walled optical insert 128 comprises a double walled extender portion 130, 132; and a new lens 112 inserted into the extender portion 130, 132. The optical insert 128 further comprises a mounting assembly having a shape which matches with the lower profile of the original lens retainer 104. The eyewear having the original lenses 102 can comprise a frame 100 having a pair of lens retainers 104, each with a defined lower profile.

Figure 11:
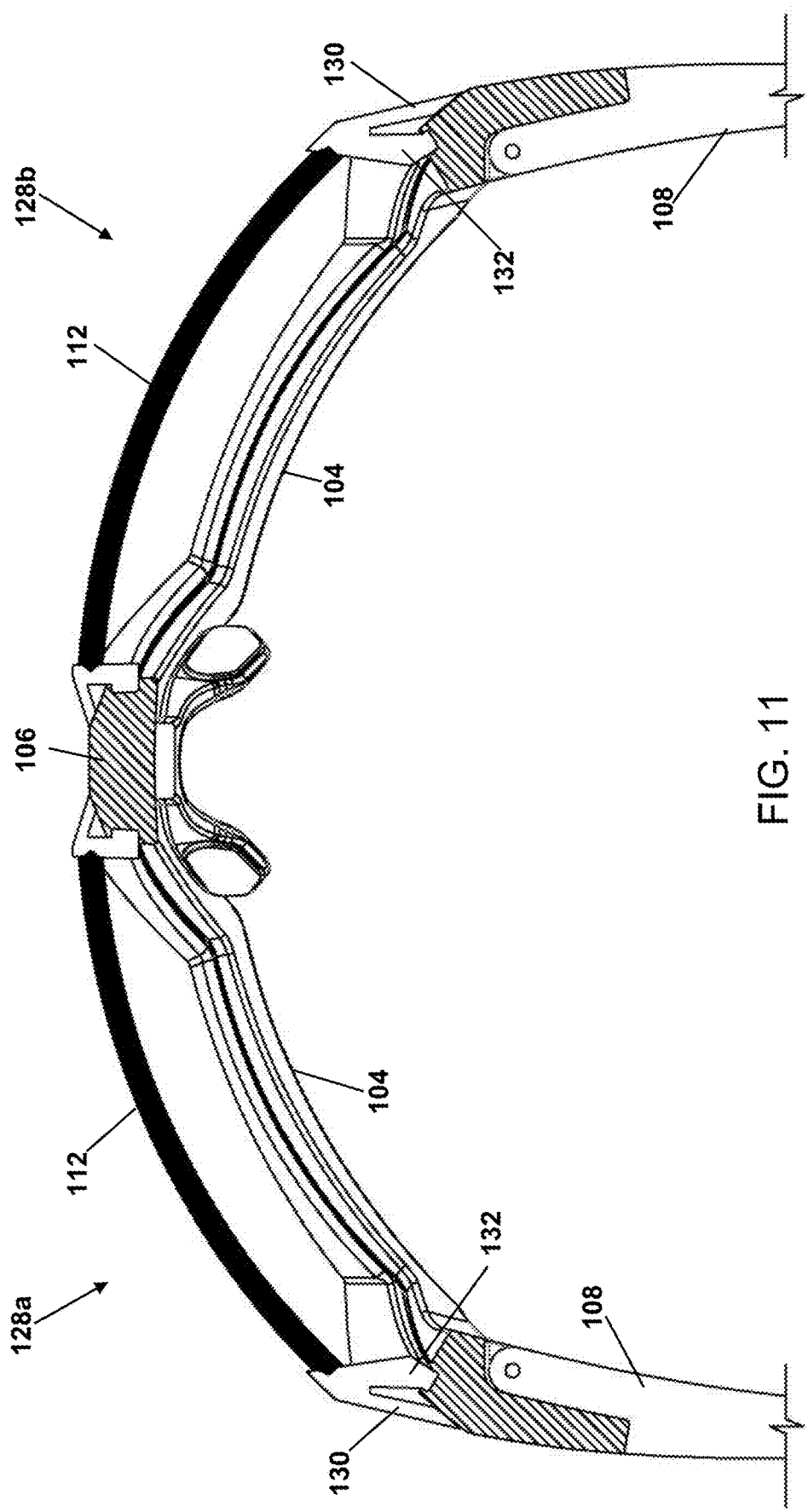
FIG. 11 is a cross-sectional view of the eyewear having double wall optical inserts shown in FIG. 9.

FIG. 11 is a cross-sectional view of the eyewear having double walled optical inserts 128a, 128b. The double walled optical insert 128 comprises an extender portion 130, 132 which holds a new lens 112 on a first end and comprises a mounting assembly on a second end opposite the first end. The mounting assembly comprises a profile which matches that of the conventional lens retainer. In this embodiment, the extender portion of the double walled optical insert 128 comprises at least an outer wall 130 and an inner wall 132.

The double-walled optical insert 128 shown in FIG. 11 includes a second wall that can act as an extra protective layer to prevent the insert 128 from ejecting upon impact. The double wall can be formed by mounting a second layer of the extender portion 130 to the first layer 130. The second layer 132 may be mounted using any suitable mounting process such as adhesion, fastening, overmoulding, etc. The first layer may be referred to as the outer wall 130 and the second layer may be referred to as the inner wall 132. Furthermore, there can optionally be a portion of space between the inner 132 and outer wall 130. The space between the walls can be filled using an impact absorbing material such as foam, plastic, air, or any other suitable material.

FIG. 12 provides a cross-sectional view of the eyewear having double walled optical inserts 128. FIG. 13 provides an enlarged view of the double walled optical insert 128 shown in FIG. 12. It can be seen that the left optical insert 128a in FIG. 12 is receiving an impact 126 to the outer wall 130. However, the left lens 112a, having a double walled optical insert 128a stays in place even after receiving the impact 126. The double walls 130, 132 can act as an extra protective layer to prevent the insert from ejecting upon impact. In contrast, the single walled optical insert 110 shown in FIG. 7 and FIG. 8 ejected upon receiving an impact. In this embodiment, it can be seen that the double walled optical insert 128 deforms as a result of the impact 126. Therefore, it can be appreciated that the space 134 between the inner 132 and outer wall 130 of the optical insert 128 can be filled with air or a foam such that the impact to the outer optical insert wall can be absorbed by the impact absorbing material.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. An eyewear comprising:
    a frame having at least a first lens retainer with a defined lower profile, the first lens retainer including a groove extending along at least a portion of the defined lower profile; a nose bridge portion; and a pair of arms attached thereto;
    the lens retainer holding an optical insert comprising:
        an extender portion having a first end for attaching a new lens and a mounting assembly on a second end opposite the first end for attaching to the lens retainer;
        the mounting assembly comprising a profile which matches that of the defined lower profile of the lens retainer;
        wherein the mounting assembly is configured to be received in the groove along the defined lower profile of the lens retainer, thereby mounting the extender portion having the new lens attached at the first end to the lens retainer.

2. The eyewear of claim 1, wherein the extender portion of the optical insert comprises an outer wall and an inner wall adjacent the outer wall.

3. The eyewear of claim 2, wherein the outer wall deforms after receiving an impact and the inner wall remains undeformed.

4. The eyewear of claim 3, wherein an impact absorbing material is provided between the outer wall and the inner wall to absorb shock received during the impact.

5. The eyewear of claim 4, wherein the impact absorbing material is selected from a group consisting of: foam, plastic and air.

6. The eyewear of claim 1, wherein the optical insert is detachably mounted to the lens retainer.

7. The eyewear of claim 1, wherein the new lens is a prescription lens.

8. The eyewear of claim 1, wherein the mounting assembly at the second end of the extender portion comprises a male end portion and wherein the groove of the lens retainer comprises a female groove complementary to and sized to receive the male end portion.

9. The eyewear of claim 1, wherein the first end of the extender portion comprises a female groove complementary to and sized to receive the new lens having a male end portion.

10. A method of transforming conventional lenses of eyewear comprising:
    forming an optical insert comprising:
        an extender portion having a first end for attaching a new lens and a mounting assembly on a second end opposite the first end;
        the mounting assembly comprising a profile which matches a defined lower profile of the conventional lenses
    removing the conventional lenses from the eyewear; and
    replacing the conventional lenses with the optical insert such that the extender portion having the new lens attached at the first end replaces the conventional lenses.

11. The method of claim 10, wherein the extender portion of the optical insert comprises an outer wall and an inner wall adjacent the outer wall.

12. The method of claim 11, wherein the outer wall deforms after receiving an impact and the inner wall remains undeformed.

13. The method of claim 12, wherein an impact absorbing material is provided between the outer wall and the inner wall to absorb shock received during the impact.

14. The method of claim 13, wherein the impact absorbing material is selected from a group consisting of: foam, plastic and air.

15. The method of claim 10, wherein the conventional lenses of the eyewear are reversibly replaced with the optical insert.

16. An optical insert for transforming conventional lenses of eyewear, the optical insert comprising:
- an extender portion having a first end for attaching a new lens and a mounting assembly on a second end opposite the first end for attaching to a lens retainer of the eyewear;
- the mounting assembly comprising a profile which matches that of a defined lower profile of the lens retainer, and is configured to be received in a groove extending along at least a portion of the defined lower profile of the lens retainer, thereby mounting the extender portion having the new lens attached at the first end to the lens retainer.

17. The optical insert of claim 16, wherein the extender portion of the optical insert comprises an outer wall and an inner wall adjacent the outer wall.

18. The optical insert of claim 17, wherein the outer wall deforms after receiving an impact and the inner wall remains undeformed.

19. The optical insert of claim 18, wherein an impact absorbing material is provided between the outer wall and the inner wall to absorb shock received during the impact.

20. The optical insert of claim 19, wherein the impact absorbing material is selected from a group consisting of: foam, plastic and air.

21. The optical insert of claim 16, wherein the optical insert is detachably mounted to the lens retainer.

22. The optical insert of claim 16, wherein the mounting assembly at the second end of the extender portion comprises a male end portion and wherein the groove of the lens retainer comprises a female groove complementary to and sized to receive the male end portion.

23. The optical insert of claim 16, wherein the first end of the extender portion comprises a female groove complementary to and sized to receive the new lens having a male end portion.

* * * * *